United States Patent
Zellweger et al.

(10) Patent No.: US 9,528,612 B2
(45) Date of Patent: Dec. 27, 2016

(54) EXPLOSION-PROOF SLIDING GATE VALVE FOR BLOCKING A FLUID FLOW IN A PIPELINE

(71) Applicant: RICO-SICHERHEITSTECHNIK AG, Herisau (CH)

(72) Inventors: Daniel Zellweger, Gais (CH); Roland Hafner, Uzwil (CH); Giuseppe Walter Aloi, Widnau (CH)

(73) Assignee: Rico-Sicherheitstechnik AG, Herisau (CH)

( * ) Notice: Subject to any disclaimer, the term of this patent is extended or adjusted under 35 U.S.C. 154(b) by 0 days.

(21) Appl. No.: 14/717,432

(22) Filed: May 20, 2015

(65) Prior Publication Data
US 2015/0337967 A1  Nov. 26, 2015

(30) Foreign Application Priority Data
May 22, 2014 (EP) .................................. 14169407

(51) Int. Cl.
*F16K 3/02* (2006.01)

(52) U.S. Cl.
CPC ........... *F16K 3/0218* (2013.01); *F16K 3/0227* (2013.01); *F16K 3/0281* (2013.01)

(58) Field of Classification Search
CPC ..... F16K 3/0218; F16K 3/0281; F16K 3/0227
USPC 251/284, 326–330, 175, 193, 195; 277/646; 137/375; 335/257
See application file for complete search history.

(56) References Cited

U.S. PATENT DOCUMENTS

| | | | | |
|---|---|---|---|---|
| 1,868,147 A * | 7/1932 | Kruse | ..................... | F16K 3/207 126/285 A |
| 2,029,151 A * | 1/1936 | Bigelow | ................... | F16K 3/20 138/94.3 |
| 2,873,943 A * | 2/1959 | Williams | ............... | F16K 3/0281 137/238 |
| 3,232,577 A * | 2/1966 | Sargent | ................. | F16K 27/044 251/284 |
| 3,662,778 A * | 5/1972 | Leopold, Jr. | ............... | F16K 3/28 137/375 |
| 3,746,303 A * | 7/1973 | Grove | ................... | F16K 3/0227 251/159 |
| 3,797,804 A * | 3/1974 | Ashbaugh | ............... | F16K 13/06 251/327 |
| 3,936,031 A * | 2/1976 | Berman | .............. | A61M 1/0003 137/205 |

(Continued)

FOREIGN PATENT DOCUMENTS

EP  0 062 552 A1  10/1982

*Primary Examiner* — John Bastianelli
(74) *Attorney, Agent, or Firm* — Davis & Bujold PLLC; Michael J. Bujold

(57) ABSTRACT

An explosion-proof sliding gate valve (1) for blocking a fluid flow (F) in a pipeline, which comprises: a sliding gate valve housing (2), a sealing plate (3) which is movably mounted in the slide gate valve housing (2) between an operating position (B) and a closed position (S), wherein in the closed position (S) the sealing plate (3) blocks the fluid flow (F), a mechanism for moving the sealing plate (3) from the operating position (B) into the closed position (S), and at least one deformation body (4) for damping movement of the sealing plate. The deformation body is arranged, according to the invention, at the side between sliding gate valve housing (2) and sealing plate (3).

17 Claims, 8 Drawing Sheets

(56) References Cited

U.S. PATENT DOCUMENTS

| | | | | |
|---|---|---|---|---|
| 3,957,245 | A | * | 5/1976 | Daghe ................. F16K 3/12 137/375 |
| 3,980,094 | A | | 9/1976 | Schröder et al. |
| 4,162,058 | A | * | 7/1979 | Ellis ................. F16K 3/314 251/326 |
| 4,264,054 | A | * | 4/1981 | Morrill ................. F16K 3/0236 251/328 |
| 4,279,402 | A | | 7/1981 | Wey et al. |
| 5,413,140 | A | * | 5/1995 | Kimpel ................. F16K 3/0227 137/375 |
| 5,660,371 | A | * | 8/1997 | Davis ................. F16K 3/0281 251/327 |
| 6,131,594 | A | | 10/2000 | Staggs et al. |
| 6,260,490 | B1 | * | 7/2001 | Wark ................. F16K 3/10 110/101 R |
| 7,309,057 | B2 | * | 12/2007 | Santiago ................. F16J 15/46 251/172 |
| 2007/0007484 | A1 | * | 1/2007 | Zellweger ................. F16K 3/314 251/327 |
| 2010/0224815 | A1 | * | 9/2010 | Sidler ................. F16K 3/0227 251/326 |
| 2013/0221252 | A1 | | 8/2013 | Eijkelenberg et al. |

* cited by examiner

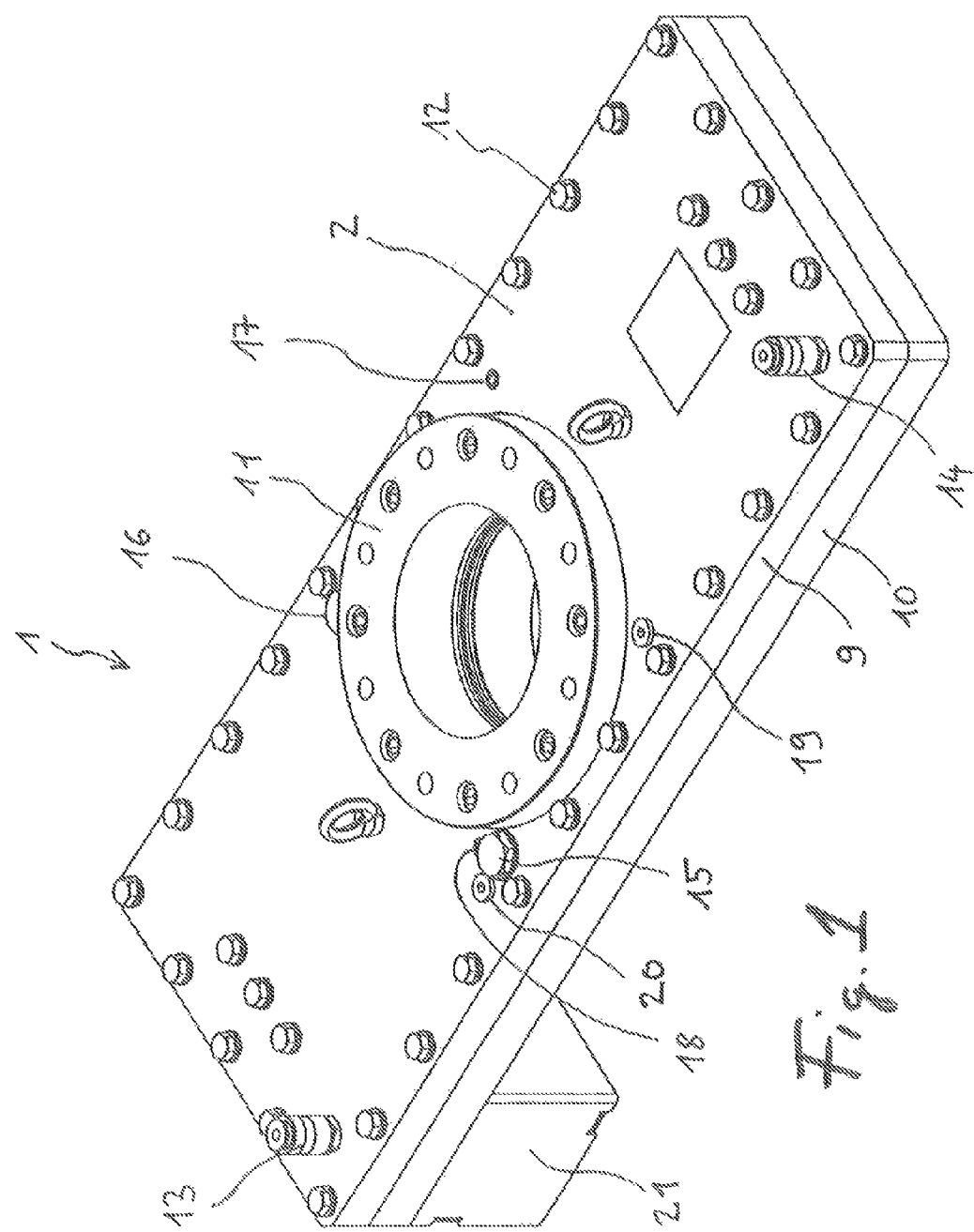

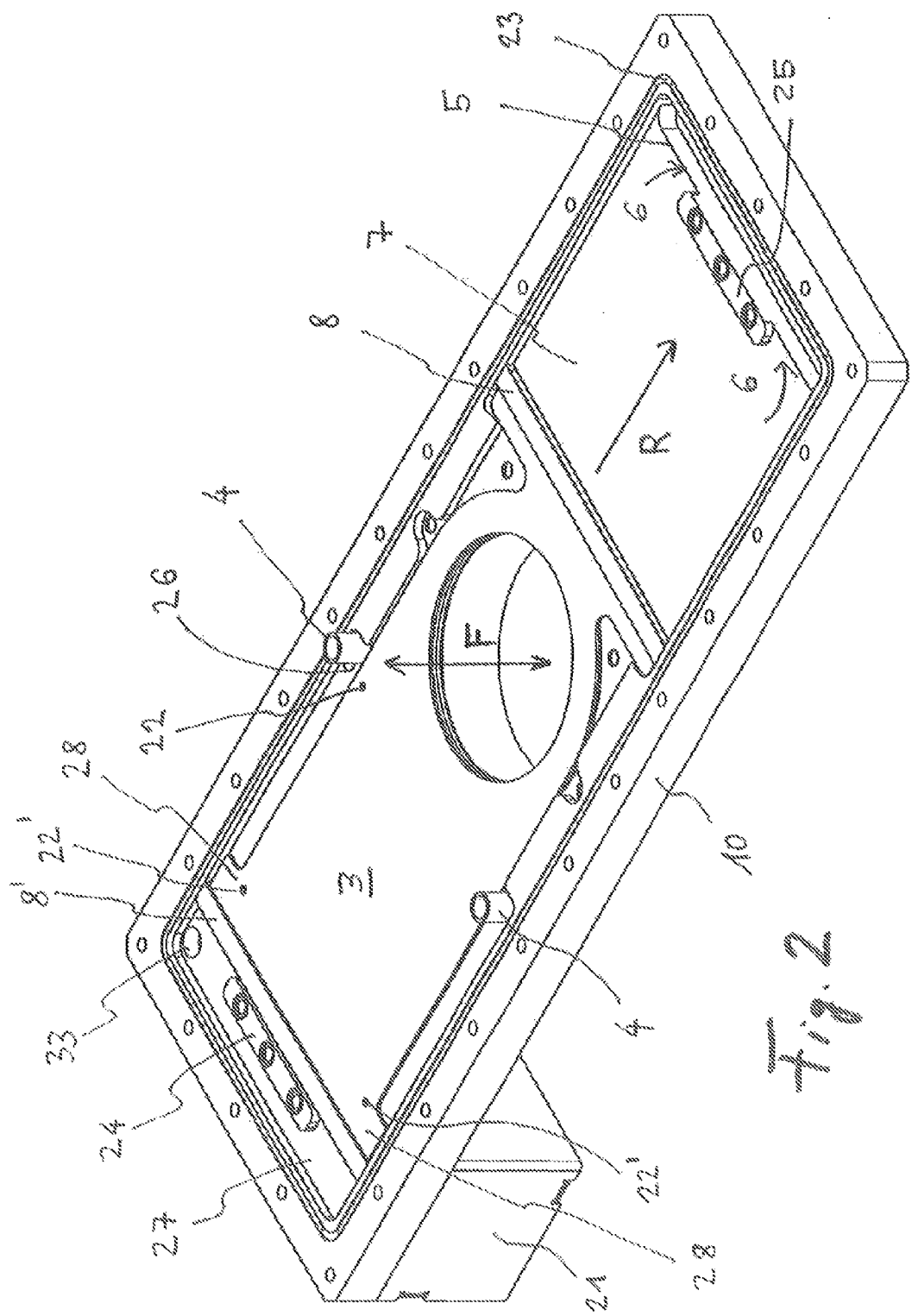

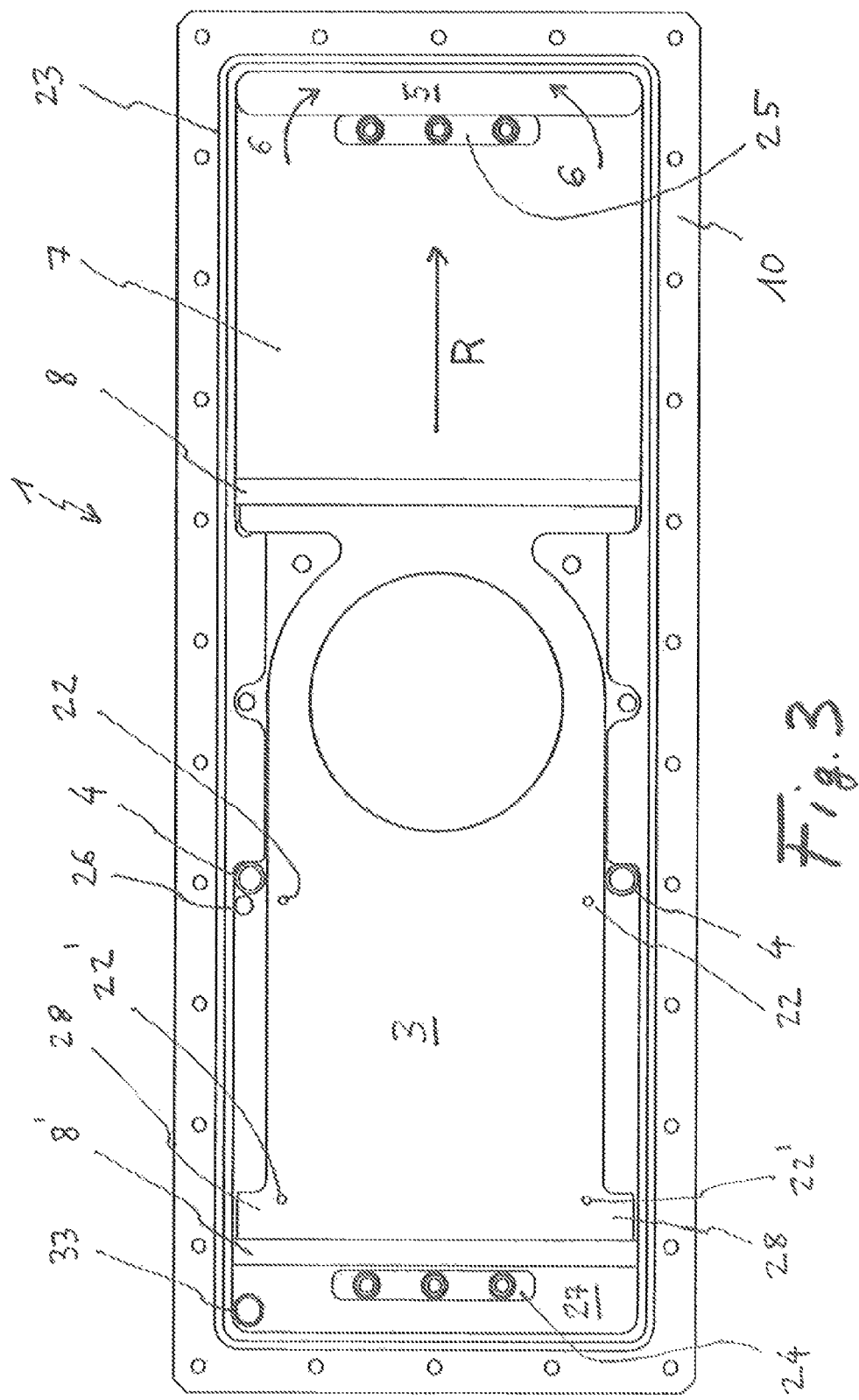

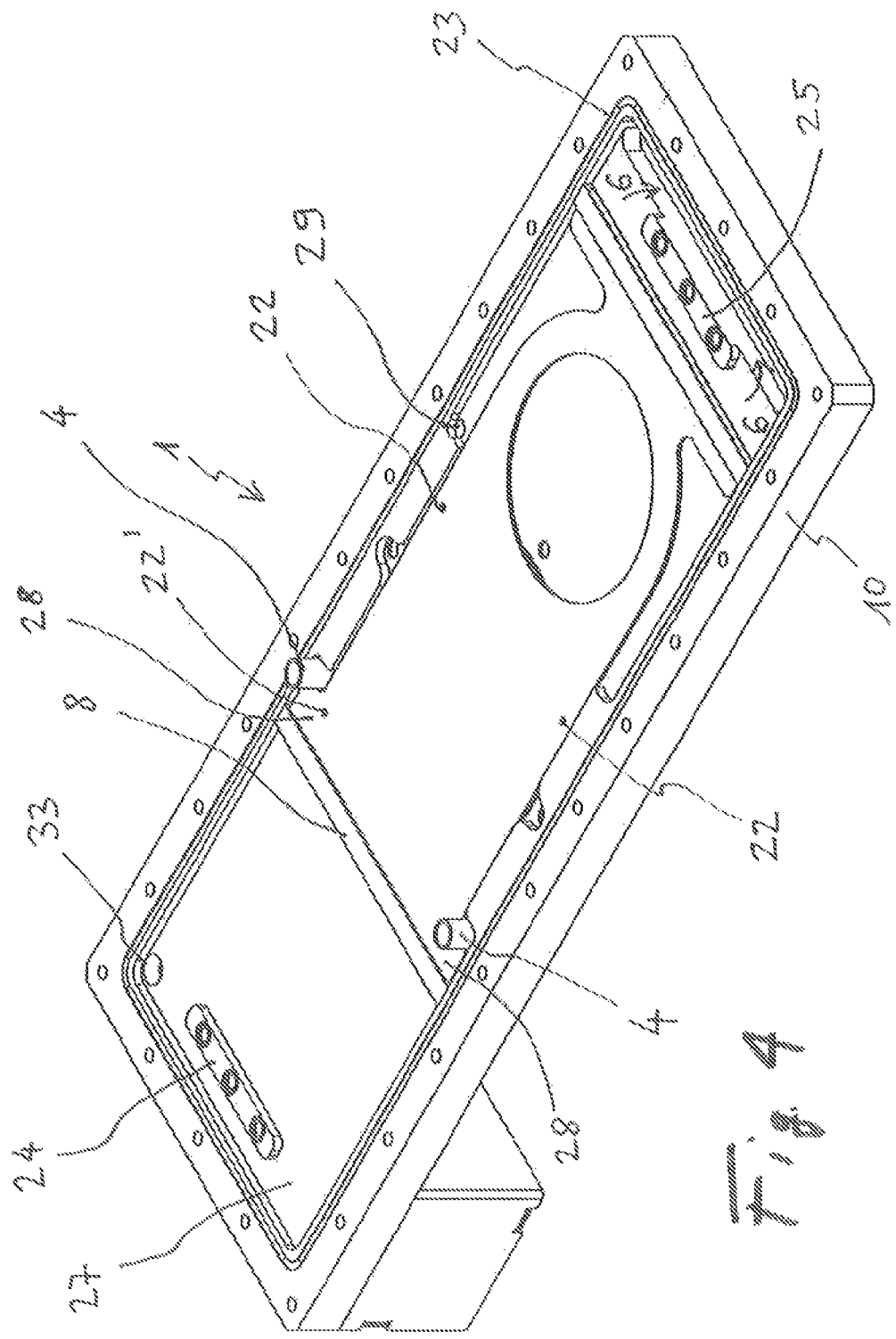

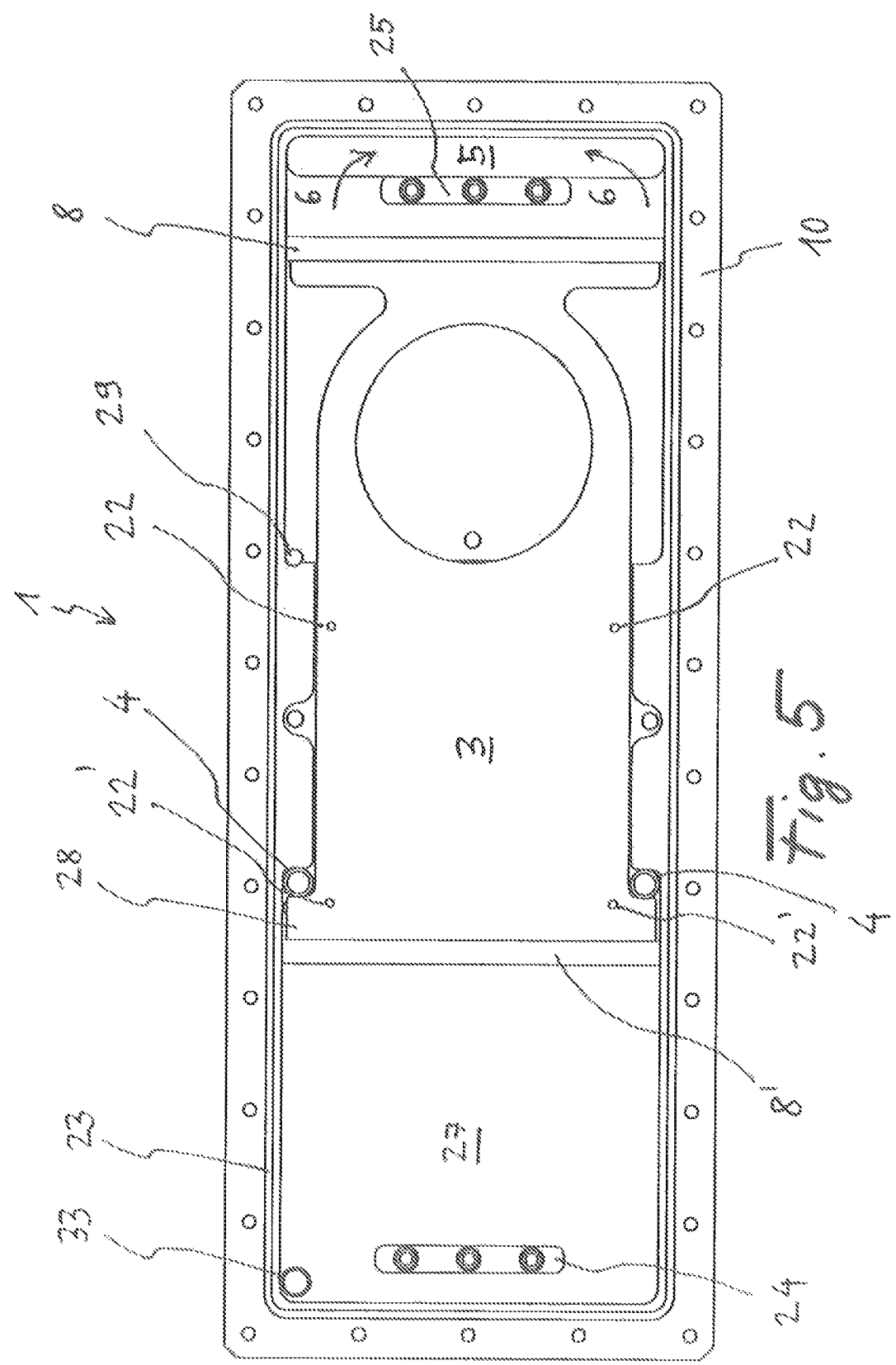

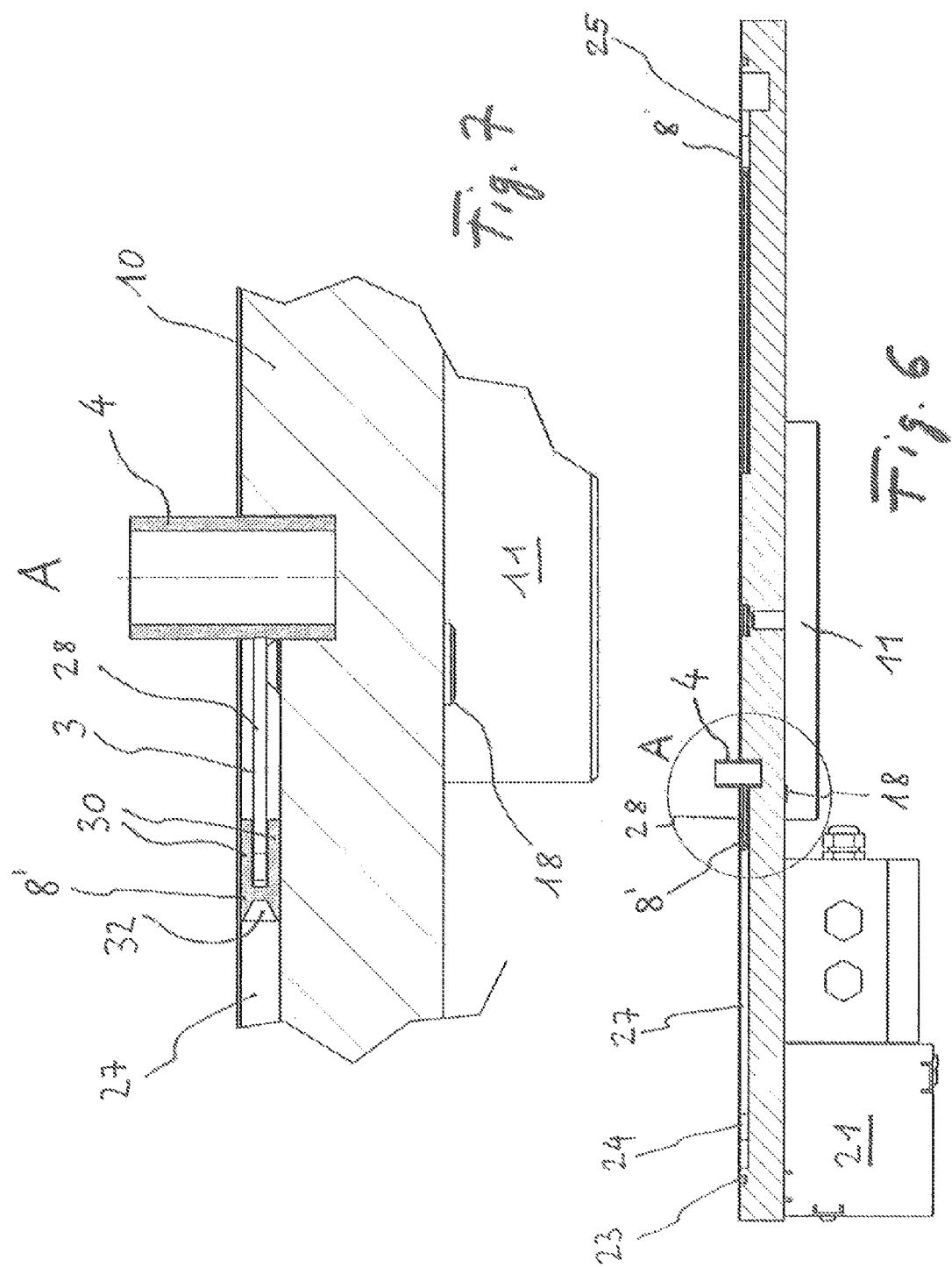

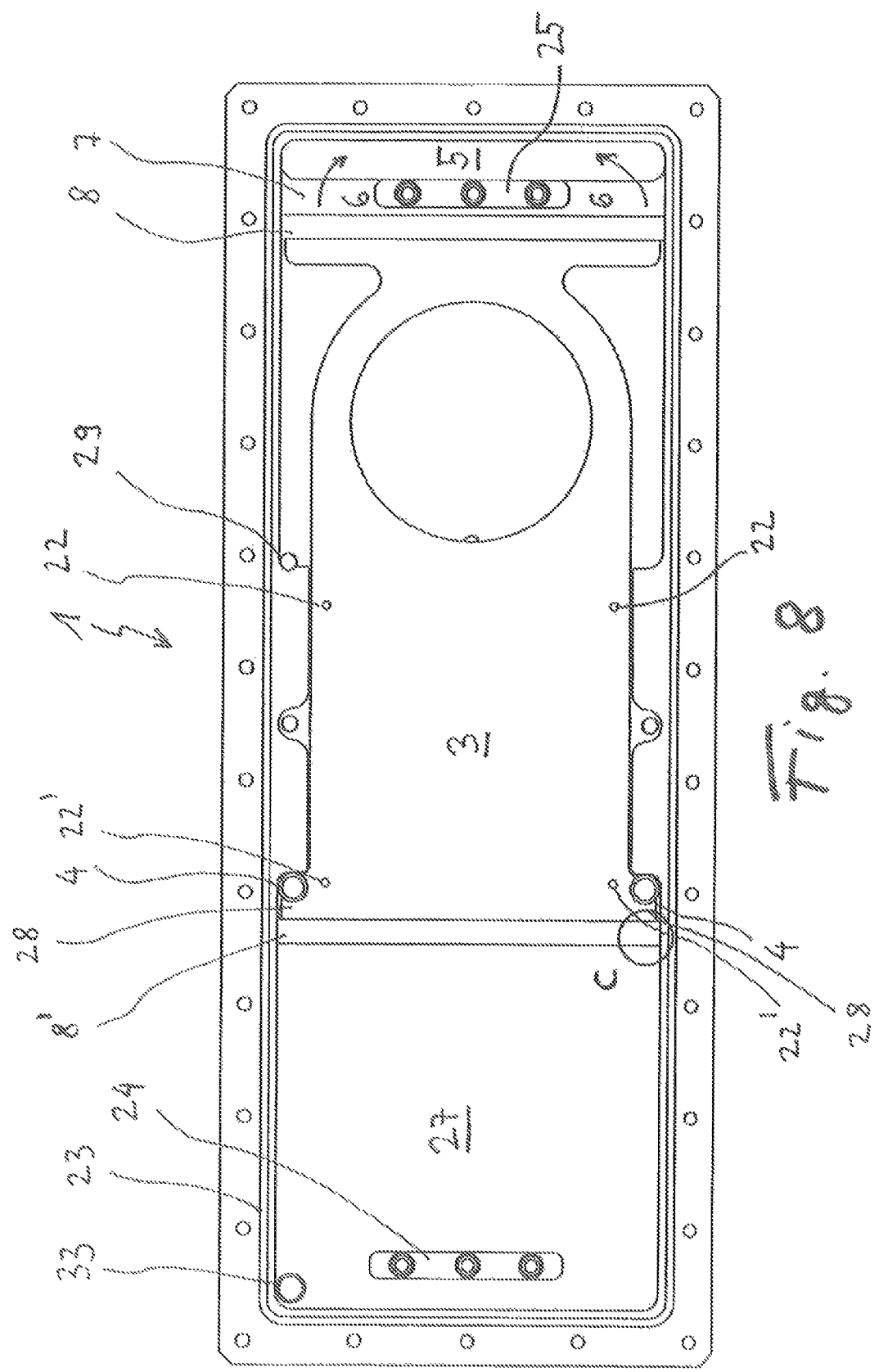

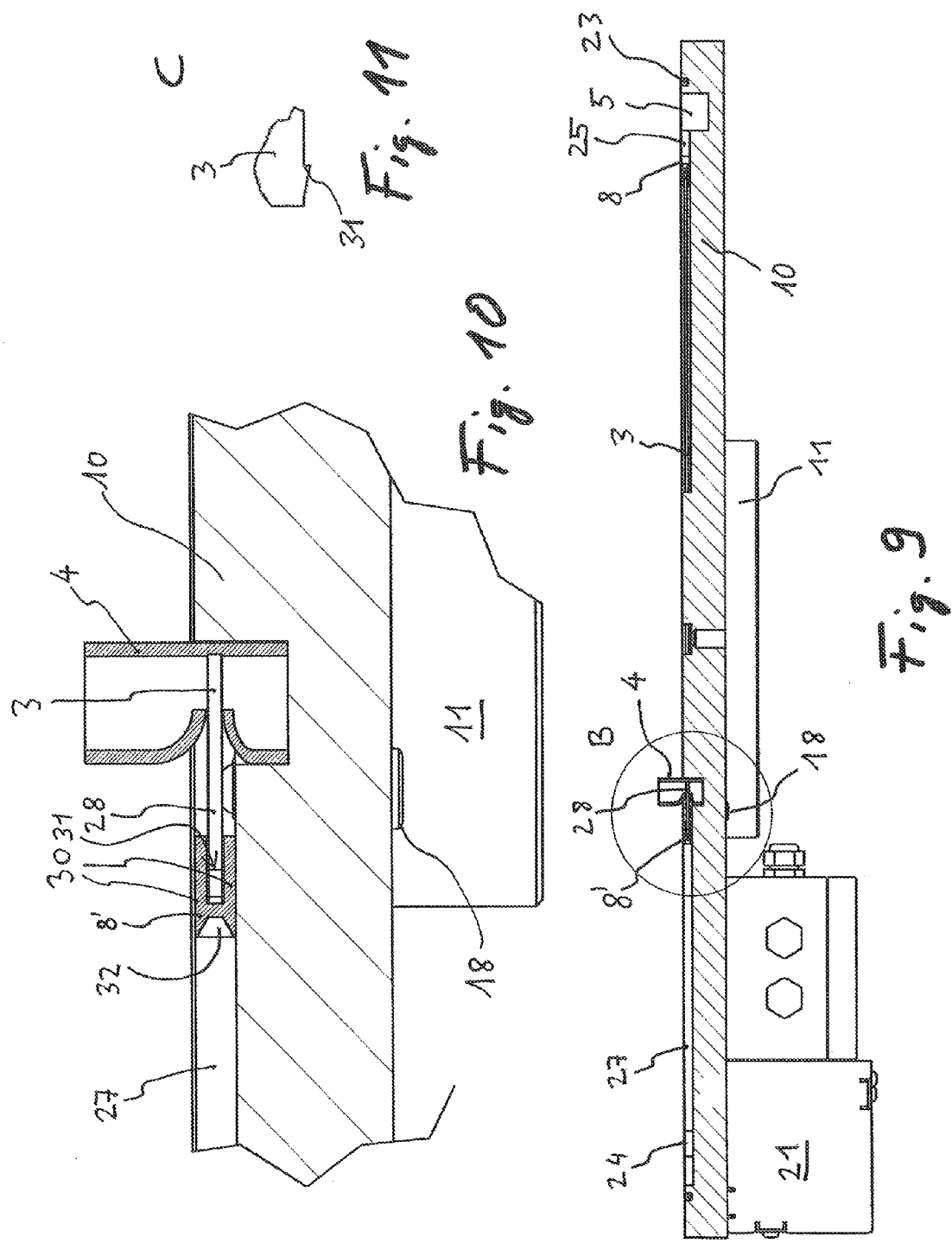

EXPLOSION-PROOF SLIDING GATE VALVE FOR BLOCKING A FLUID FLOW IN A PIPELINE

BACKGROUND OF THE INVENTION

Explosion-proof sliding gate valves are used in pipelines and plants which conduct potentially explosive gases and/or dusts. The pipeline or plant is equipped with pressure sensors and/or flame sensors which detect an explosion and activate one or more gas generators which contain an explosive or gas charge. As a result of the generated pressure, the sliding gate valve is closed and so effectively prevents the propagation of flames and pressure waves. Also known are explosion-proof sliding gate valves which are operated by means of a pneumatic, hydraulic and/or mechanical accumulator device, for example a compression spring.

In this case, the sealing plate is first of all accelerated powerfully and then, upon reaching the closed position, is braked. Consequently, the sealing plate has to be of a robust construction and must not be damaged especially when reaching the closed position since otherwise the sealing properties are not sufficient to block flames and pressure waves.

In order to damp the sealing plate when reacting the closed position use is made of oil piston brakes which also prevent the recoil of the sealing plate after reaching the closed position. After an activation of the sliding gate valve, these do not have to be replaced or serviced but are very cost intensive in their acquisition. Alternatively, it is known—e.g. from U.S. Pat. No. 3,980,094 or U.S. Pat. No. 6,131,534—to arrange a damping element in an impact region of the sealing plate. The damping element is formed from a plastically deformable material and is deformed upon impact of the sealing plate. After an activation of the sliding gate valve, the damping element has to be replaced, which is often associated with appreciable cost.

SUMMARY OF THE INVENTION

It is therefore the object of the invention to avoid the disadvantages of the known explosion-proof sliding gate valve and especially to disclose an explosion-proof sliding gate valve of the type referred to in the introduction which enables good damping of the sealing plate, is inexpensive to produce and to maintain and allows short closing times.

The explosion-proof sliding gate valve according to the invention comprises a sliding gate valve housing, a sealing plate which is movably mounted in the sliding gate valve housing between an operating position and a closed position—wherein in the closed position the sealing plate blocks the fluid flow—means for moving the sealing plate from the operating position into the closed position, and at least one deformation body for damping the movement of the sealing plate. The deformation body in this case is arranged at the side between sliding gate valve housing and sealing plate. Meant by this is that the deformation body is arranged between the sliding gate valve housing and a region of the sealing plate which is essentially parallel to a closing direction of the sealing plate. The sealing plate is especially of flat design with an encompassing narrow side, wherein two sections of the narrow side extend respectively essentially parallel to the closing direction and two sections of the narrow side extend essentially perpendicularly to the closing direction.

The deformation body is therefore arranged between the section of the narrow side which extends essentially parallel to the closing direction and the sliding gate valve housing.

In the sense of the present invention, the region which is located between sliding gate valve housing and sealing plate and extends along a closing direction of the sealing plate is understood by "at the side".

As a result of arranging the deformation body at the side of the sealing plate this does not have to be strengthened overall but only in the region where the sealing plate interacts with the deformation body. This also has the effect of the sealing plate being able to be of a lighter construction, which in turn allows faster closing times. Furthermore, the replacing of the deformation body is simpler because as a result of the arrangement at the side accessibility to this is better. Moreover, the deformation of the deformation body can clamp the sealing plate in the closed position and so can possibly prevent a recoil of the sealing plate.

In the sense of the present invention, a direction which is parallel to a closing direction of the sealing plate is understood by "longitudinal direction".

In the sense of the present invention, a direction which is transverse to a longitudinal direction and lies in the plane of the sealing plate is understood by "transverse direction".

The deformation body can consist of a plastically or elastically deformable material. It is evident that, depending on dimensions, mass and closing time of the sliding gate valve and of the sealing plate, the materials which are test suited for this purpose are known to, or are to be determined by, the person skilled in the art.

The deformation body preferably comprises a hollow body. It has been proved that hollow bodies are better suited to the damping of the sealing plate than solid bodies.

The deformation body especially preferably comprises a tube which is preferably circular. The deformation body can especially be designed as a tube. This is particularly advantageous since recourse can be made to standard components. The tube is especially preferably produced from aluminium or an aluminium alloy.

In a preferred embodiment, a tube axis is arranged essentially perpendicularly to a movement direction of the sealing plate. With such an arrangement, the best damping properties of the deformation body are achieved. The deformable body is squashed when the sliding gate valve is activated or the wall of the deformation, designed as a tube, is at least particularly penetrated and cut. In this case, a large amount of the kinetic energy of the sealing plate is suppressed and in the process the sealing plate is fully braked upon reaching the closed position.

The deformation body is preferably attached on the sliding gate valve housing. In this way, a simple construction is made possible since the deformation body has preferably only to be installed in a holder which is provided for it in the sliding gate valve housing. It is understood that the deformation body can alternatively or additionally be attached by means of as per so known fastening means.

Alternatively, the deformation body can be attached on the sealing plate. Also, the deformation body is mounted on the sealing plate in this case. As mentioned above with reference to the sliding gate valve housing, known fastening means are a possibility.

The explosion-proof sliding gate valve according to the invention for blocking a fluid flow in a pipeline also comprises a sliding gate valve housing, a sealing plate which is movably mounted in the sliding gate valve housing between an operating position and a closed position—wherein in the closed position the sealing plate blocks the fluid flow—and means for moving the sealing plate from the operating position into the closed position. The explosion-proof sliding gate valve can additionally comprise a deformation body, as described above.

In the sliding gate valve housing there is a compression chamber which is arranged adjacent to a front inner chamber of the sliding gate valve housing. The fluid, which is displaced during movement of the sealing plate into the closed position can flow into the compression chamber.

The occurrence of an excessively high pressure in the front inner chamber, which can make closing of the sealing plate more difficult or make it impossible, is therefore avoided.

The compression chamber is preferably arranged on the end face of the front inner chamber and is fluidically connected to the front inner chamber by means of two passages.

The sealing plate is preferably provided with a seal which is preferably arranged on an end-side face of the sealing plate. The end-side face of the sealing plate extends in the transverse direction and is delimited by the sliding gate valve housing. As a result, the sealing of an inner chamber, which is delimited inter alia by the seal, is made possible, which inner chamber possibly serves as the cylinder chamber of a piston-cylinder arrangement and is required for operating the explosion-proof sliding gate valve. The sealing plate undertakes the function of the piston in this case.

The seal is preferably fitted on the end of the sealing plate, wherein the sealing plate is preferably provided with locking tabs for retention of the seal. The seal can therefore be fitted very simply and, if necessary, removed, whereas the locking fasts enable a secure connection between seal and sealing plate. Alternatively, the seal can be adhesively fastened on the sealing plate or fastened by known fastening means such as screws, bolts and the like.

The seal is preferably produced from plastic, preferably polytetrafluoroethylene (PTFE).

BRIEF DESCRIPTION OF THE DRAWINGS

The invention is better described below based on a preferred exemplary embodiment in conjunction with the drawings. In the drawing:

FIG. 1 shows a perspective view of a fast-acting sliding gate valve,

FIG. 2 shows a perspective view of the fast-acting sliding gate valve of FIG. 1 without the upper housing part and with the sealing plate open, FIG. 3 shows a plan view of the fast-acting sliding gate valve of FIG. 2, FIG. 4 shows a perspective view of the fast-acting sliding gate valve of FIG. 1 without the upper housing part and with the sealing plate closed, FIG. 5 shows a plan view of the fast-acting sliding gate valve of FIG. 4, FIG. 6 shows a sectional view in the longitudinal direction through the fast-acting sliding gate valve of FIG. 4, FIG. 7 shows a detailed view of the detail A of FIG. 6, FIG. 3 shows a plan view of a fast-acting sliding gate valve without the upper housing part after an activation.

FIG. 9 shows a sectional view in the longitudinal through the fast-acting sliding gate valve of FIG. 8, FIG. 10 shows a detailed view of the detail B of FIG. 9, and FIG. 11 shows a detailed view of the detail C of FIG. 8 without the seal,

DESCRIPTION OF THE PREFERRED EMBODIMENT

Shown in FIG. 1 is a fast-acting sliding gate valve 1 which comprises a valve housing 2 consisting of an upper and a lower part 9 and 10. Both the upper housing part 9 and the lower housing part 10 (not visible) have a flange 11 for connecting to a pipeline.

The upper housing part 9 is connected to the lower housing part 10 by means of a multiplicity of screws 12, of which for the sake of clarity only one is provided with a designation.

Also, compressed air connections 13 and 14 are arranged on the upper horsing part 9 and are used for testing the fast-acting sliding gate valve 1. The sealing screws which are designated 15 and 16, the vent which is designated 17, the spring loaded pressure piece which is designated 18 and the sealing screws which are designated 19 and 20, are explained later.

The activation device of the fast-acting sliding gate valve 1, which is preferably a pyrotechnic charge for activating the fast-acting sliding gate valve 1, is located in the housing part 21. Alternatively, as already mentioned in the introduction, pneumatic, hydraulic or mechanical accumulator devices are a possibility for activation.

Shown in FIGS. 2 and 3 is the fast-acting sliding gate valve 1 without the upper housing part 2. Visible is the sealing plate 3 which is located in the operating position B and enables a fluid flow F. The sealing plate 3 is produced, from a thin metal sheet and has a seal 8 or 8' on its two end faces. The through-holes 22 or 22' respectively with the pressure piece 13 and prevent the sealing plate 3—depending on the installation orientation—from leaving the operating position B or a test position T. The sealing plate 3 has respective through-holes 22 and 22' on its two long sides, although only one pair of pressure pieces 18 is provided on one long side of the sliding gate valve housing 2. The effect achieved with this is that the sealing plate 3 can always be correctly installed. A faulty installation is therefore excluded.

Arranged at the sides of the sealing plate 3 is respectively a tubular deformation body 4.

The encompassing groove 23, in the operationally ready state, i.e. when the sliding gate valve housing 2 is closed, accommodates a seal, which is not additionally shown. The opening 33 connects the pyrotechnic charge to the interior of the sliding gate valve housing 2.

The cross pieces 24 and 25 are reinforcement areas of the lower housing part 10 and avoid bulging of the upper housing part 9 during activation of the fast-acting sliding gate valve 1.

The vent 17 comprises a one-way valve and enables pressure compensation between inner chamber and environment.

Limit switches 26 and 29 enable position detection of the sealing plate.

Shown in FIGS. 4 and 5, corresponding to FIGS. 2 and 3, is the fast-acting sliding gate valve 1, wherein the sealing plate 3 is not located in the operating position B but in the test position T. This test position T of the sealing plate 3 serves only for test purposes and is only occupied in order to check the functioning capability of the fast-acting sliding gate valve 1.

In this case, compressed air is delivered via the compressed air connection 13 into the rear cylinder chamber 27 which creates the movement of the sealing plate in the direction R. The applied pressure in this exemplary embodiment is between 2 and 8 bar. The sealing plate 3 is then moved until the stop wing 28 of the sealing plate 3 butts against the respective deformation body 4. Upon reaching this test position T, the pair of pressure pieces 18 latch into the through-hole 22' and lock the sealing plate 3.

By delivering compressed air via the compressed air connection 14 into the front cylinder chamber 7 the sealing plate 3 can be brought into the operating position B again. Also, the vent 17 enables pressure compensation in this case.

By removing the sealing screws 19 and 20, the position of the sealing plate can be visually checked. If the sealing plate 3 is located in the operating positron B, this is visible through the threaded hole of the sealing screw 19, whereas the lower housing part 10 is visible through the threaded hole of the sealing screw 20. The situation is in reverse if the sealing plate 3 has occupied the test position T.

The deformation body 4 can be checked, and replaced if necessary, by removing the sealing screws 15 and 16.

The seals 8 and 8' are similarly constructed from polytetrafluoroethylene (PTFE). These can be seen better in FIGS. 6, 7, 9 and 10, whereas a plan view of the sealing plate 3 without the seal 8' can be seen in FIG. 11.

Although in the following text reference is made to the seal 8', the description correspondingly also applies to the seal 8.

The seal 8' comprises two legs 30 in a spaced apart arrangement between which the sealing plate is inserted. A projecting locking tab 31, which is arranged respectively at the side of the sealing plate 3, secures the seal 8'.

Opposite the legs, the seal 8' has a recess 32 which improves the sealing properties. When the fast-acting sliding gate valve 1 is activated, the pressure in the rear cylinder chamber 27 has the effect of the sidewalls of the recess 32 being pressed apart.

The principle of operation of the fast-acting sliding gate valve 1 during an activation is explained in the following text.

The activation of the pyrotechnic charge brings about a flow of explosion gases through the opening 33 into the rear cylinder chamber 27. As a consequence of the pressure increase, the sealing plate is accelerated in the direction R until the stop wings 28 contact the respective deformation body 4. This corresponds to the test position T. The high kinetic energy of the sealing plate 3 brings about a deformation of the deformation body 4 which brakes the sealing plate 3 and is shown schematically in FIGS. 9 and 10. In the process, the sealing plate, may be clamped in the closed position S so that a recoil of the sealing plate 3 is not possible. It is to be noted that although in FIGS. 9 and 10 the deformation body 4 is shown as being partially cut through by the sealing plate 3, this is not necessarily the case. The deformation body 4 can also be squashed, or completely cut through. It is important that the deformation body 4 is able to absorb as far as possible the kinetic energy of the sealing plate.

During the movement of the sealing plate 3 in the direction R, the air which is present in the front cylinder chamber 7 is compressed. This compression of the air can lead to the sealing plate 3 being moved in a direction opposite the closing direction R upon reaching the closed position S or, in the worst case, not reaching the closed position S, both with the result that the pipeline is not blocked. As a countermeasure, the compression chamber 5 is arranged on the end face of the front cylinder chamber 7 and connected to this via the two passages which are schematically represented by the arrows 6. The compression chamber 5 is dimensioned in such a way that the air which is displaced by the sealing plate 3 does not create an excessively large pressure increase.

The invention claimed is:

1. A fast-acting sliding gate valve (1) for blocking a fluid flow (F) in a pipeline, comprising:
   a sliding gate valve housing (2),
   a sealing plate (3) which is movably mounted in the slide gate valve housing (2) between an operating position (B) and a closed position (S), wherein in the closed position (S) the sealing plate (3) blocks the fluid flow (F),
   means for moving the sealing plate (3) from the operating position (B) into the closed position (S), and
   at least one deformation body (4) for damping and stopping the movement of the sealing plate,
   wherein the deformation body is arranged at a side between the sliding gate valve housing (2) and the sealing plate (3), which side extends along a closing direction of the sealing plate (3).

2. The fast-acting sliding gate valve (1) according to claim 1, wherein the deformation body (4) comprises a hollow body.

3. The fast-acting sliding gate valve (1) according to claim 1, wherein the deformation body (4) comprises a tube.

4. The fast-acting sliding gate valve (1) according to claim 3, wherein the tube is a circular tube.

5. The fast-acting sliding gate valve (1) according to claim 3, wherein the tube (4) consists of aluminum or an aluminum alloy.

6. The fast-acting sliding gate valve (1) according to claim 3, wherein a tube axis is arranged essentially perpendicularly to a movement direction (R) of the sealing plate (3).

7. The fast-acting sliding gate valve (1) according to claim 1, wherein the deformation body (4) is attached on the sliding gate valve housing (2).

8. The fast-acting sliding gate valve (1) according to claim 1, wherein the deformation body (4) is attached on the sealing plate (3).

9. The fast-acting sliding gate valve (1) according to claim 1, wherein in the sliding gate valve housing (2) a compression chamber (5) is arranged adjacent to a front cylinder chamber (7) of the sliding gate valve housing (2), into which compression chamber the fluid which is displaced during the movement of the sealing plate (3) into the closed position (S) can flow.

10. The fast-acting sliding gate valve (1) according to claim 9, wherein the compression chamber (5) is arranged on the end face of the front cylinder chamber (7) and is fluidically connected to the front cylinder chamber (7) by means of two passages (6).

11. The fast-acting sliding gate valve (1) according to claim 1, wherein the sealing plate (3) is provided with at least one seal (8, 8').

12. The fast-acting sliding gate valve (1) according to claim 11, wherein the seal (8, 8') is arranged on an end-side face of the sealing plate (3).

13. The fast-acting sliding gate valve (1) according to claim 12, wherein the seal (8, 8') is fitted on the end of the sealing plate (3).

14. The fast-acting sliding gate valve (1) according to claim 13, wherein the sealing plate (3) is provided with locking tabs (31) for retention of the seal (8, 8').

15. The fast-acting sliding gate valve (1) according to claim 11, wherein the seal (8, 8') is produced from plastic.

16. The fast-acting sliding gate valve (1) according to claim 15, wherein the seal (8, 8') is made of polytetrafluoroethylene.

17. The fast-acting sliding gate valve (1) according to claim 1, wherein the sliding gate valve (1) is an explosion-proof sliding gate valve.

\* \* \* \* \*